United States Patent [19]

Ishikawa

[11] 3,724,138
[45] Apr. 3, 1973

[54] GRINDING RESISTANCE DETECTING DEVICE

[75] Inventor: Mineo Ishikawa, Kariya, Japan

[73] Assignee: Toyoda Koki Kabushiki Kaisha, Kariya-shi, Aichi-ken, Japan

[22] Filed: Sept. 29, 1971

[21] Appl. No.: 184,672

[30] Foreign Application Priority Data

Oct. 2, 1970 Japan..................................45/86979

[52] U.S. Cl..............................51/165 R, 51/165.8
[51] Int. Cl. .............................................B24b 49/16
[58] Field of Search..............................51/165, 165.8

[56] References Cited

UNITED STATES PATENTS 3,524,285 8/1970 Rutt.................................51/165 R X
3,427,755 2/1969 Levesque.........................51/165 R X
3,274,738 9/1966 Kuniholm............................51/165 R

*Primary Examiner*—Harold D. Whitehead
*Attorney*—Norman F. Oblon et al.

[57] ABSTRACT

A grinding resistance detecting device includes a strain sensitive transducer having semiconductor strain gauges for generating an output voltage level proportional to a grinding resistance. A contact is connected to the strain sensitive transducer and is closed at a non-grinding period. A memory circuit is connected to the contact for storing a drift voltage level of the strain sensitive transducer and a differential-input amplifier is connected to the strain sensitive transducer and to the memory circuit for providing a voltage which is purely proportional to the grinding resistance.

5 Claims, 6 Drawing Figures

INVENTOR
MINEO ISHIKAWA

GRINDING RESISTANCE DETECTING DEVICE

BACKGROUND OF THE INVENTION

1. Field of the Invention

The present invention relates to a grinding resistance detecting device which includes a strain sensitive transducer having semiconductor strain gauges therein.

2. Description of the Prior Art

In a grinding machine, especially of the type having an adaptive control system, it is often necessary to detect the grinding resistance exerted on the grinding wheel thereof.

In the past, one method of detecting the grinding resistance was to connect a wattmeter to the motor which was arranged for driving the grinding wheel. One problem with such prior art grinding resistance detecting devices was that the same had a low sensitivity.

Recently, a strain sensitive transducer having semiconductor strain gauges therein which are fixed to a deformable part which is deformed in accordance with the grinding resistance has been utilized in connection with a Wheatstone bridge arrangement. While the strain sensitive transducer having semiconductor strain gauges therein has been found to be of high sensitivity, the same, as shown in FIG. 1, has a defect in that a drift voltage is generated in accordance with variations of the ambient temperature with a lapse of time. As a result of the generated voltages, it has been impossible to exactly measure the grinding resistance exerted on the grinding wheel.

SUMMARY OF THE INVENTION

Accordingly, it is an object of the present invention to provide a new and improved unique grinding resistance detecting device for use with a grinding machine.

Another object of the present invention is the provision of a new and improved unique grinding resistance detecting device which is automatically capable of performing zeroing adjustments in relation to the grinding cycles of the grinding machine.

A still further object of the present invention is the provision of a new and improved unique grinding resistance detecting device which is capable of canceling any drift voltage caused by variations of the ambient temperature.

Briefly, the foregoing and other objects of the present invention are attained by the provision of a unique transducive type grinding detecting device which includes a memory circuit for storing any drift voltages present during a non-grinding operation and means for compensating for any drift present during a grinding operation such that an accurate real grinding resistance can be continuously detected and an optimum grinding operation thereby performed.

BRIEF DESCRIPTION OF THE DRAWINGS

The foregoing and other objects of the present invention will become fully apparent from the following detailed description of a preferred embodiment of the present invention with reference to the accompanying drawings in which.

DETAILED DESCRIPTION OF THE PREFERRED EMBODIMENTS

Figure 2:
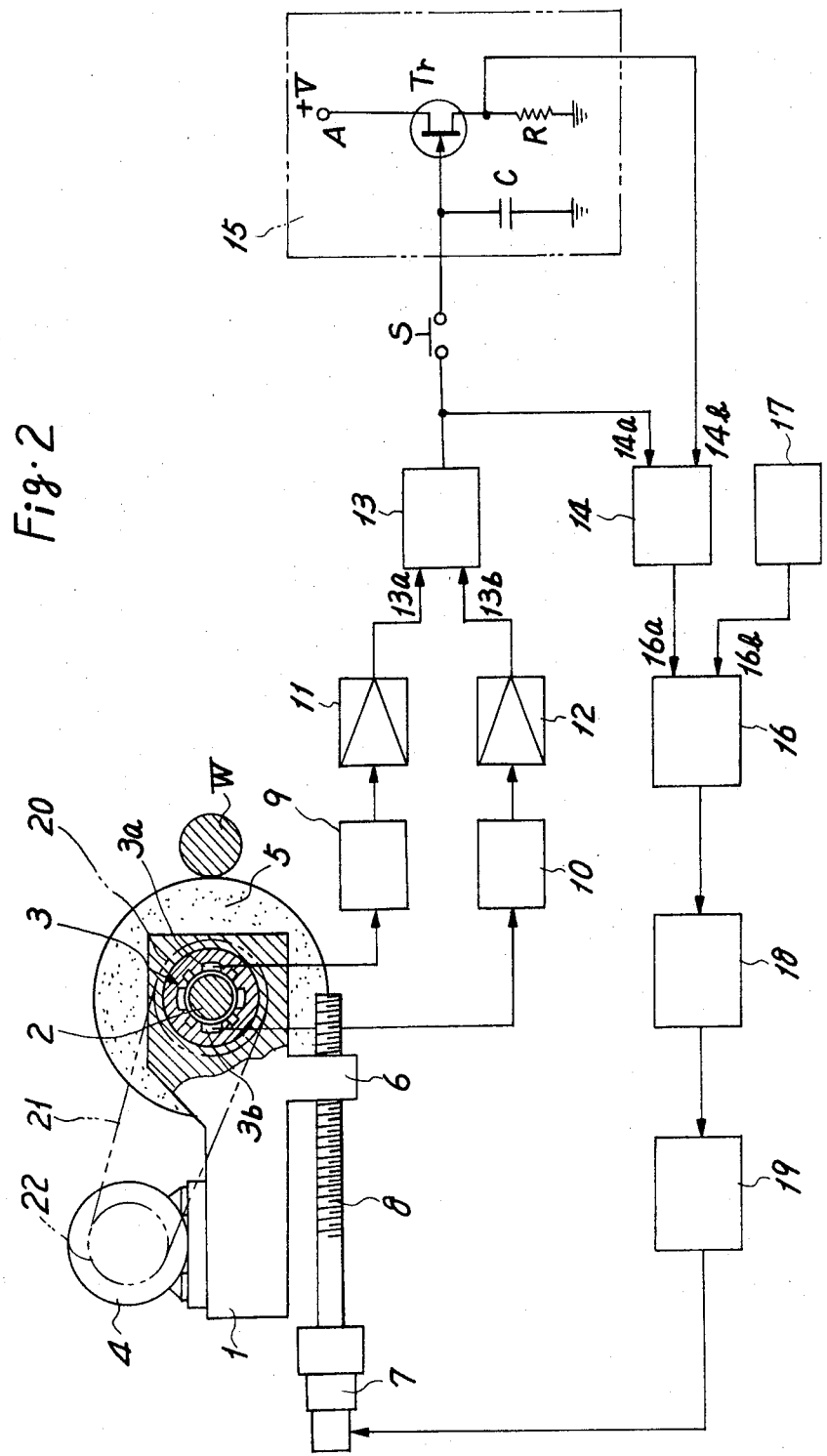
FIG. 2 is a block diagram showing a grinding resistance detecting device of the present invention applied to a grinding machine having an adaptive control system.

Referring now to the drawings, wherein like reference numerals designate identical or corresponding parts throughout the several views, and more particularly to FIG. 2 thereof, wherein a grinding resistance detecting device is shown as being applied to a grinding machine in which a wheel head 1 rotatably supports a wheel spindle 2 by means of a conventional fluid bearing 3. The wheel head 1 is slidably mounted on a bed, not shown. The spindle 2 carries at one end thereof a belt pulley 20 that is connected by one or more belts 21 to a pulley 22 secured to a driving shaft of an electric motor 4 that is mounted on the wheel head 1. The spindle 2 carries at the other end thereof a grinding wheel 5, by which a workpiece W that is rotatably supported on a worktable carried on the bed, not shown, is ground. A feeding screw 8 engaged with a nut 6 secured to the wheel head 1 is rotatably mounted on the bed and one end thereof is connected to a pulse motor 7.

The fluid bearing 3 has a plurality of cavities equiangularly arranged around the wheel spindle 2. Two opposite cavities, namely, forward cavity 3a and rear cavity 3b, are disposed along a line which is directed in the same direction as is the grinding resistance. The respective pressure levels generated in the forward and rear cavities 3a and 3b are introduced to first and second conventional pressure transducers 9 and 10, and are thereby converted into corresponding voltage levels.

Figure 3:
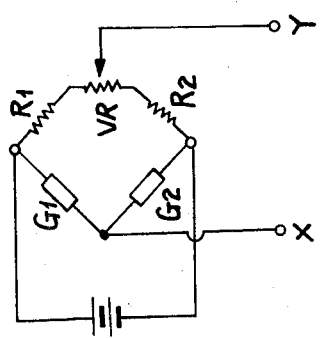
FIG. 3 shows a bridge circuit arrangement for a pressure transducer.

The conventional pressure transducer 9 includes two semiconductor strain gauges which are bonded on a deformable diaphragm. If pressure is applied to the diaphragm, mechanical strains will be imposed on the strain gauges and thereby respectively increase or decrease the specific resistances thereof. As shown in FIG. 3, two semiconductor strain gauges G1 and G2, two fixed resistances R1 and R2 and a balancing variable resistance VR are connected in the form of a Wheatstone bridge. After initially balancing the bridge circuit by adjusting the variable resistance VR, if pressure is then applied to the diaphragm, the balance of the bridge will be destroyed. Accordingly, an output voltage level corresponding to the pressure level can be detected between output terminals X and Y. The conventional pressure transducer 10 is constructed in the same manner as the pressure transducer 9.

The output voltage levels of the first and second pressure transducers 9 and 10 are amplified by respective conventional amplifiers 11 and 12 and the outputs thereof are respectively transmitted to input terminals 13a and 13b of a first conventional differential-input amplifier 13. An output voltage level which is proportional to the difference between the voltage levels of the first and second pressure transducers 9 and 10 is generated by the first differential-input amplifier 13 and is applied to an input terminal 14a of a second differential-input amplifier 14. The output voltage of the first differential-input amplifier 13 is also transmitted to a memory circuit 15 by way of a switching contact S. An output terminal of the memory circuit 15 is connected to the other input terminal 14b of the second differential-input amplifier 14.

The memory circuit 15 has a field-effect-transistor Tr and a condenser C. The drain terminal of the field-effect-transistor Tr is connected to a terminal A to which a source, not shown, of voltage +V is applied. The source terminal of the field-effect-transistor Tr is grounded by way of a resistance R, and the gate terminal of the field-effect-transistor Tr is connected to the switching contact S. One electrode of the condenser C is connected to the gate terminal of the field-effect-transistor Tr, and the other electrode thereof is grounded. Accordingly, when the switching contact S is closed, the condenser C will be charged with electricity until the voltage level thereof becomes equal to the output voltage level of the first differential-input amplifier 13. Since the charged voltage level of the condenser C is applied to the gate terminal of the field-effect-transistor Tr, accordingly, the electric current from the drain terminal to the source terminal will be controlled by the voltage level of the condenser C. The source terminal of the field-effect-transistor Tr is also connected to the input terminal 14b of the second differential-input amplifier 14. As is well known, the voltage level at the source terminal will become almost equal to the voltage level applied to the gate terminal. The second differential-input amplifier 14 will generate an output voltage level which is proportional to the difference between the output voltage level of the first differential-input amplifier 13 and the voltage level at the source terminal of the field-effect-transistor Tr. As hereinafter described in more detail, the output voltage level of the second differential-input amplifier 14 will not drift with variations of the ambient temperature, but will be directly proportional to the difference between the pressure levels generated in the forward and rear cavities 3a and 3b, or in other words the grinding resistance.

The switching contact S is closed in accordance with a closing of a limit switch, not shown, which is arranged for detecting movement of the wheel head 1 to a retracted position. When the wheel head 1 is at the retracted position, no grinding resistance will exist, and therefore the pressure levels in the forward and rear cavities are held equal. However, the output voltage levels of the first and second pressure transducers 9 and 10 will become different from each other in accordance with the variations of the resistances of the semiconductor strain gauges in accordance with variations of the ambient temperature. The first differential-input amplifier 13 will therefore generate a drift voltage. Accordingly, by a closing of the switching contact S the drift voltage level will be stored in the condenser C of the memory circuit 15. It should be understood that the time when the contact S is closed is not limited to the period when the wheel head 1 is retracted, but may be any time when a grinding resistance is not exerted on the grinding wheel 5.

The second differential-input amplifier 14 is connected to an input terminal 16a of a third differential-input amplifier 16, and a circuit 17 for presetting a maximum grinding resistance is connected to the other input terminal 16b thereof. The third differential-input amplifier 16 generates an output voltage level which is proportional to the difference between the output voltage level of the second differential-input amplifier 14 and the voltage level transmitted from the preset circuit 17. The output voltage of the third differential-input amplifier 16 is applied to a feed control circuit 18 which controls a pulse generator 19. The frequency of the feed command pulses which are generated by the pulse generator 19 will therefore be compensated for by the feed control circuit 18 in accordance with the output voltage level of the third differential-input amplifier 16, that is the difference between the real grinding resistance exerted on the grinding wheel 5 and the desired maximum grinding resistance preset in the circuit 17. It should be understood that the feed command pulses are delivered to the pulse motor 7 in order to rotate it at a speed proportional to the frequency thereof. Accordingly, the wheel head 1 will be moved by means of the pulse motor 7 and the feeding screw 8 in such a manner so that the real grinding resistance will become equal to the desired maximum grinding resistance.

The grinding resistance detecting device which is constructed as described above will operate in the following manner. When the wheel head 1 is at the retracted position, the switching contact S will be closed and the drift voltage generated by the first differential-input amplifier 13 will thereby be stored in the condenser C. The voltage level of the condenser C will then be applied to the gate terminal of the field-effect-transistor Tr, and the voltage level at the source terminal will become equal to that of the condenser C. The drift voltage level and the source terminal voltage level will thus become equal to each other and are respectively delivered to the input terminals 14a and 14b of the second differential-input amplifier 14. The output voltage level of the second differential-input amplifier 14 therefore automatically becomes zero in accordance with the closing of the switching contact S. After a starting button, not shown, is pushed, the wheel head 1 is moved in a forward direction at a rapid feed speed and the limit switch is deenergized. The switching contact S is thereby opened, however the drift voltage level will still be memorized by the condenser C. When the wheel head 1 is moved to a predetermined position where the grinding wheel 5 is very close to the workpiece W, the feed speed of the wheel head 1 is changed from the rapid feed speed to a grinding speed. The grinding wheel 5 will then move further in a forward direction and begin to grind the workpiece W. Since a grinding resistance is exerted on the grinding wheel 5, the pressure level in the forward cavity 3a will descend and the pressure level in the rear cavity 3b will ascend. The pressure levels so developed in the forward and rear cavities 3a and 3b are then converted into corresponding voltage levels by the first and second pressure transducers 9 and 10. The first differential-input amplifier 13 generates an output voltage level in accordance with the difference between the voltage levels of the first and second pressure transducers 9 and 10. The output voltage level of the first differential-input amplifier, however, is not only proportional to the difference between the pressure levels in the forward and rear cavities 3a and 3b, but also contains the drift voltage level. Since the output voltage level of the first differential-input amplifier 13 and the source terminal voltage level of the field-effect-transistor Tr, which is equal to the drift voltage level memorized in the condenser C, are applied to the input terminals 14a and 14b, the second differential-input amplifier 14 erases the drift voltage level and generates an output voltage level which is thereby purely proportional to the real grinding resistance exerted on the grinding wheel 5. The grinding operation will then be continued in such a manner that the real grinding resistance is maintained equal to the tolerable maximum grinding resistance.

Figure 1:
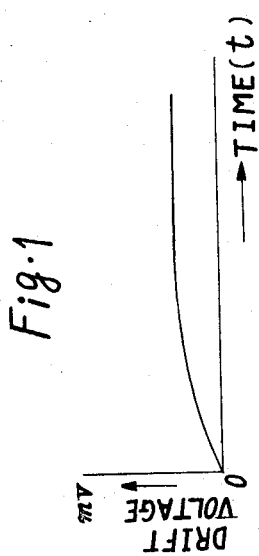
FIG. 1 shows the drift voltage with lapse of time generated by a strain sensitive transducer having semiconductor strain gauges therein.
Figure 6:
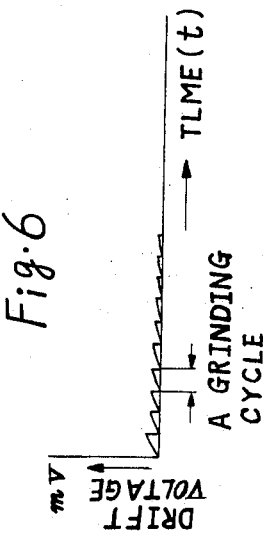
FIG. 6 shows the drift voltage generated by the grinding resistance detecting device of the present invention.

Now, when the diameter of the workpiece W becomes equal to a predetermined dimension, the wheel head 1 will be retracted and the switching contact S will be closed. By a closing of the switching contact S, the drift voltage level at that time will be restored to the condenser C. Since the zeroing adjustment will be performed every grinding cycle, the drift voltage, as shown in FIG. 6, will be removed every grinding cycle.

It is apparent that the memory circuit 15 may include a conventional operational amplifier having a high input impedance instead of a field-effect-transistor.

Figure 4:
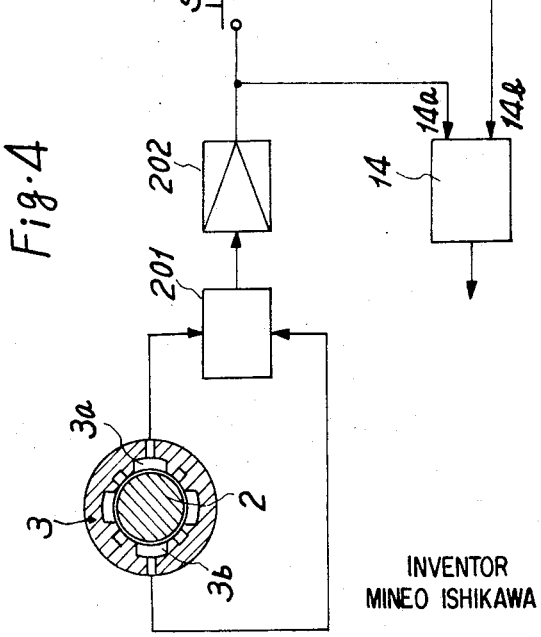
FIGS. 4 and 5 show other examples of grinding resistance detecting devices of the present invention.

Referring now to FIG. 4, there is shown a modified embodiment of FIG. 2 wherein the difference between the pressure levels in the forward and rear cavities 3a and 3b of the fluid bearing 3 is detected by a conventional differential pressure sensitive transducer 201 having semiconductor strain gauges therein. The pressure levels generated in the forward and rear cavities 3a and 3b are applied to the differential pressure sensitive transducer 201 and are converted therein into a corresponding differential voltage level. The differential pressure sensitive transducer 201, not shown in detail, has a diaphragm and a pair of pressure chambers disposed at the opposite sides of the diaphragm. The pressure levels in the forward and rear cavities 3a and 3b are respectively transmitted to the pair of pressure chambers and the diaphragm is therefore deformed in accordance with the differential pressure. Two semiconductor strain gauges are bonded on the diaphragm and are connected in a bridge circuit arrangement. Accordingly, the differential pressure sensitive transducer 201 will generate an output voltage level corresponding to the differential pressure level. The output voltage of the differential pressure sensitive transducer 201 is amplified by an amplifier 202 and is transmitted to the memory circuit 15 by way of the switching contact S and to the second differential-input amplifier 14. As described in FIG. 2, the second differential-input amplifier 14 will generate an output voltage level which is purely proportional to the grinding resistance exerted on the grinding wheel 5.

Figure 5:
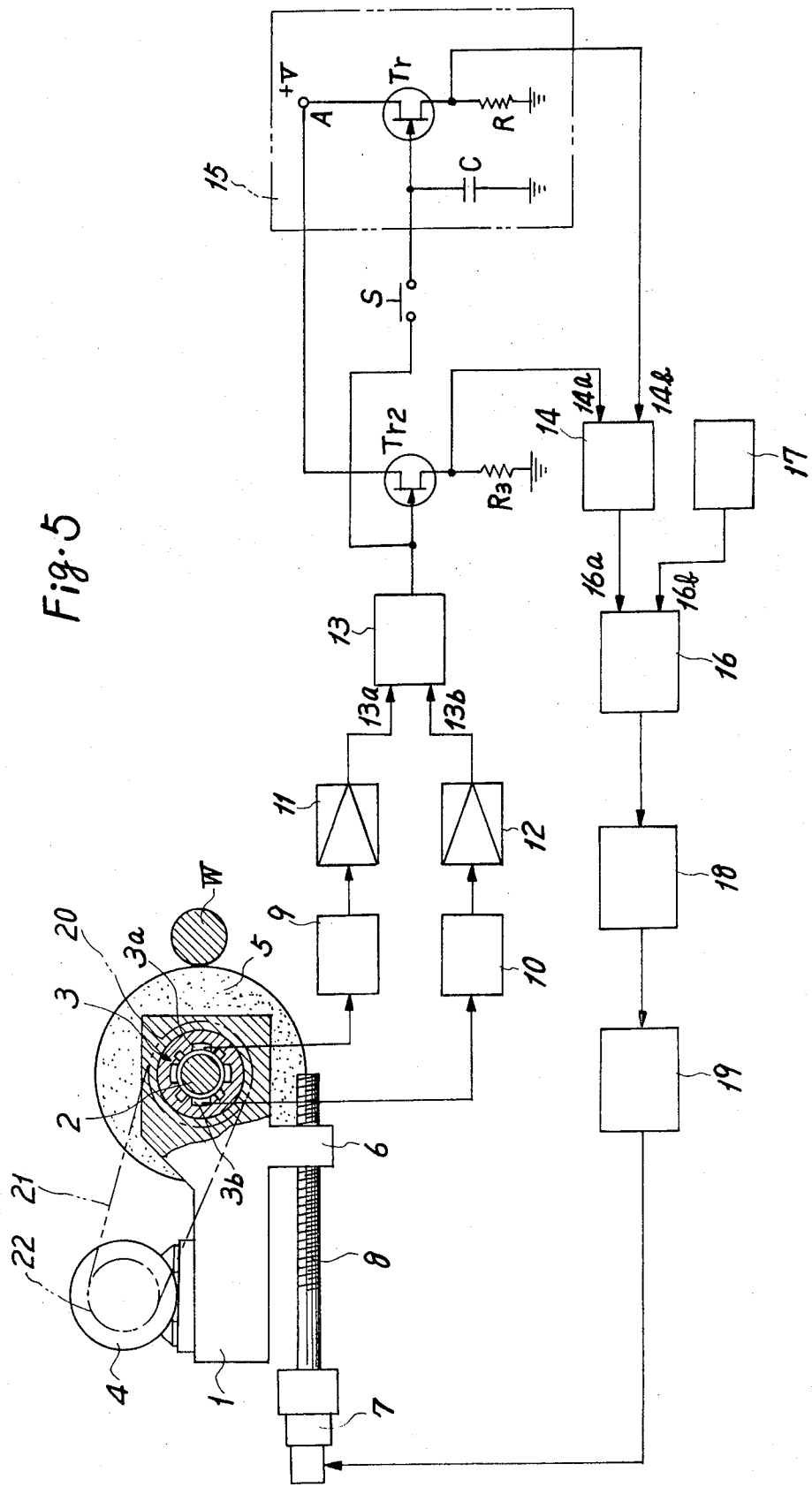

Referring to FIG. 5, there is shown still another modified embodiment of FIG. 2. In a field-effect-transistor, the voltage level at the source terminal becomes almost equal to the voltage level at the gate terminal. However, since in actuality the voltage level at the source terminal is a bit lower than the voltage level at the gate terminal, the second differential-input amplifier 14, in FIG. 2, cannot completely cancel the drift voltage level. To avoid this situation, in FIG. 5, a second field-effect-transistor Tr2 is connected between the first and second differential-input amplifiers 13 and 14 in parallel with the memory circuit 15. The drain terminal of the second field-effect-transistor Tr2 is connected to the terminal A and is supplied with a voltage +V. The source terminal of the second field-effect-transistor Tr2 is grounded by way of a resistance R3 and is also connected to the input terminal 14a of the second differential-input amplifier 14. The gate terminal of the second field-effect-transistor Tr2 is connected to the first differential-input amplifier 13. A dropping of the drift voltage level because of the field-effect-transistor Tr can thereby be canceled by a dropping of the output voltage level of the first differential-input amplifier 13 because of the second field-effect-transistor Tr2.

It should now be apparent that in accordance with the teachings of the present invention the grinding resistance of the grinding wheel of a grinding machine can be accurately detected with no error due to ambient temperature changes during the grinding operation.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A grinding resistance detecting device comprising:
   strain sensitive transducer means having semiconductor strain gauge means therein, said strain sensitive transducer means having a deformable part thereof which is deformed in accordance with a grinding resistance exerted on a grinding wheel of a grinding machine and for generating an output voltage level proportional to said grinding resistance;
   a contact connected to said strain sensitive transducer means, said contact being closed at a non-grinding period;
   a memory circuit connected to said contact for storing the drift voltage level of said strain sensitive means; and,
   a differential-input amplifier connected to said strain sensitive transducer means and said memory circuit.

2. A grinding resistance detecting device as set forth in claim 1, wherein:
   said memory circuit includes a field-effect-transistor, the gate terminal of said field-effect-transistor being connected to said contact, the drain terminal of said field-effect-transistor being supplied with a source of voltage, and the source terminal of said field-effect-transistor being grounded by way of a resistance and being further connected to said differential-input amplifier; and,
   said memory circuit further includes a condenser, one electrode of which is connected to said gate terminal and the other electrode being grounded.

3. A grinding resistance detecting device as set forth in claim 2, wherein is further included a second field-effect-transistor, the gate terminal of said second field-effect-transistor being coupled to said strain sensitive transducer means, the drain terminal thereof being supplied with a voltage, and the source terminal thereof being grounded by way of a resistance and being further connected to said differential-input amplifier.

4. A grinding resistance detecting device comprising:
pressure sensitive transducer means having semiconductor strain gauge means connected in a bridge circuit, said pressure sensitive transducer means being connected with a fluid bearing for supporting a spindle having a grinding wheel and for generating an output voltage level proportional to a grinding resistance exerted on said grinding wheel;
a contact connected to said pressure sensitive transducer means, said contact being closed during a non-grinding period;
a memory circuit connected to said contact for storing the drift voltage level of said pressure sensitive transducer means; and,
a differential-input amplifier connected to said pressure sensitive transducer means and said memory circuit.

5. A grinding resistance detecting device as set forth in claim 4, wherein said pressure sensitive transducer means is connected to forward and rear cavities of said fluid bearing and will convert the difference between pressure levels generated in said forward and rear cavities into a corresponding voltage level.

* * * * *